United States Patent
Bonnett et al.

(10) Patent No.: US 7,470,350 B2
(45) Date of Patent: Dec. 30, 2008

(54) PROCESS FOR TRITIUM REMOVAL FROM LIGHT WATER

(75) Inventors: Ian Richard Bonnett, Cardiff (GB); Anthony Busigin, Parkland, FL (US)

(73) Assignee: GE Healthcare UK Limited, Amersham (GB)

( * ) Notice: Subject to any disclaimer, the term of this patent is extended or adjusted under 35 U.S.C. 154(b) by 0 days.

(21) Appl. No.: 11/737,788

(22) Filed: Apr. 20, 2007

(65) Prior Publication Data

US 2007/0246344 A1  Oct. 25, 2007

Related U.S. Application Data

(60) Provisional application No. 60/745,554, filed on Apr. 25, 2006.

(51) Int. Cl.
| | |
|---|---|
| B01D 17/09 | (2006.01) |
| B01D 59/04 | (2006.01) |
| B01D 59/16 | (2006.01) |
| B01D 53/22 | (2006.01) |
| C01B 3/50 | (2006.01) |

(52) U.S. Cl. ............... 203/5; 202/154; 202/158; 203/12; 203/71; 423/648.1; 423/655; 422/177

(58) Field of Classification Search .......... 95/43; 96/4; 202/153–155, 158, 172; 203/5, 10, 203/12, 29, 71; 422/177; 423/255, 648.1, 423/655
See application file for complete search history.

(56) References Cited

U.S. PATENT DOCUMENTS

| | | | | | |
|---|---|---|---|---|---|
| 2,780,526 | A | * | 2/1957 | Fleck | ............... 205/627 |
| 4,173,620 | A | * | 11/1979 | Shimizu | ............... 423/648.1 |
| 4,190,507 | A | * | 2/1980 | Hesky et al. | ............... 205/347 |
| 4,190,515 | A | * | 2/1980 | Butler et al. | ............... 204/266 |
| 4,996,033 | A | * | 2/1991 | Gardner-Chavis et al. | ... 423/249 |
| 6,165,438 | A | | 12/2000 | Willms et al. | |
| 6,321,565 | B1 | * | 11/2001 | Kihara et al. | ............... 62/643 |

FOREIGN PATENT DOCUMENTS

WO   WO2007/020454   2/2007

OTHER PUBLICATIONS

Kalyanam, et al., "Recovery Process Characteristics", Fusion Technology, vol. 14, 1988, pp. 525-528.
Yoshida, et al., "Status of the ITER Tritium Plant Design", Fusion Engineering and Design, 39-40, 1998, pp. 875-882.
Busigin, et al., "Installation and Early Operation of a Complex Low Inventory Cryogenic Distillation System for the Princeton TFTR", Fusion Technology, Colume 28, 1995 pp. 1312-1316.

(Continued)

*Primary Examiner*—Virginia Manoharan
(74) *Attorney, Agent, or Firm*—Yonggang Ji

(57) ABSTRACT

A process for light water detritiation which includes the steps of water distillation for tritium stripping and enriching, followed by chemical conversion of tritium enriched water to elemental hydrogen, and finally by one or more thermal diffusion columns for final tritium enrichment. The combination of process steps takes advantage of water distillation large throughput capability at low tritium concentration with the simplicity of thermal diffusion for small throughput final tritium enrichment. The water distillation front-end and the thermal diffusion back end processes are compatible with any intermediate chemical conversion process such as electrolysis or water gas shift reaction to convert tritiated water to elemental hydrogen.

11 Claims, 3 Drawing Sheets

Tritium Recovery Process Schematic

OTHER PUBLICATIONS

Busigin, et al., "Steady State and Dynamic Simulation of the ITER Hydrogen Isotope Separation System", Fusion Technology, vol. 28, 1995 pp. 544-549.

Vasaru et al., "The Thermal Diffusion Column", VEB Deutscher der Wissenschaften, Berlin, 1968.

Busigin, et al., "CFTSIM-ITR Dynamic Fuel Cycle Model", Fusion Engineering and Design, 39-40, 1998, pp. 909-914.

Murdoch, et al., "ITER Fuel Cycle Development: EU-PT Activities", Fusion Science and Technology, vol. 48, 2005, pp. 3-10.

Sessions, "Processing Tritiated Water at the Savannah River Site: A Production-Scale Demonstration of a Palladium Membrane Reactor", Fusion Science and Technology, vol. 48, 2005, pp. 91-96.

Cristescu, et al., "Trenta Facility for Trade-Off Studies Between Combined Electrolysis Catalytic Exchange and Cryogenic Distillation Processes", Fusion Science and Technology, vol. 48, 2005, pp. 97-101.

Cristescu, et al., "ITER Dynamic Tritium Inventory Modeling Code", Fusion Science and Technology, vol. 48, 2005 pp. 343-348.

Van Hook, "Vapor Pressure of the Isotopic Waters and Ices", Journal of Physical Chemistry, vol. 72, No. 4, 1968, pp. 1234-1244.

Jones, et al., "The Separation of Isotopes by Thermal Diffusion", Reviews of Modern Physics, vol. 18, No. 2, 1946, pp. 151-224.

Perry, et al., "Liquid Distribution for Optimum Packing Performance", Chemical Engineering Progress, 1990, pp. 30-35.

* cited by examiner

Palladium Membrane Reactor 20

PROCESS FOR TRITIUM REMOVAL FROM LIGHT WATER

CROSS-REFERENCE TO RELATED APPLICATIONS

This invention claims priority to U.S. provisional patent application No. 60/745,554 filed Apr. 25, 2006; the disclosure of which is incorporated herein by reference in its entirety.

FIELD OF THE INVENTION

This invention relates generally to the field of tritium isotope recovery from water and more specifically to a process for tritium removal from light water by water distillation stripping and enrichment, followed by conversion of tritium enriched water to an elemental hydrogen stream, and final tritium enrichment by thermal diffusion.

BACKGROUND OF THE INVENTION

Several large scale facilities have been built in Canada, France, and more recently South Korea, to extract tritium from heavy water moderator systems for nuclear reactors. Kalyanam and Sood, "Fusion Technology" 1988, pp 525-528, provide a comparison of the process characteristics of these types of systems. Similar although smaller light water tritium recovery systems have been designed for fusion applications (see H. Yoshida, et al, "Fusion Eng. and Design" 1998, pp 825-882; Busigin et al, "Fusion Technology", 1995 pp 1312-1316; A. Busigin and S. K. Sood, "Fusion Technology" 1995 pp 544-549). All current large scale tritium recovery systems employ a front-end process to transfer tritium from water to elemental hydrogen, followed by a cryogenic distillation cascade to perform all or most of the hydrogen isotope separation.

Thermal diffusion columns have been used to separate hydrogen isotopes on a small scale since the 1950's as described by G. Vasaru et al, "The Thermal Diffusion Column", VEB Deutscher der Wissenschaften, Berlin, 1968. The use of this technology has been limited because it is not scaleable to large throughputs.

All commercial large scale processes for water detritiation are based on transfer of tritium from water to elemental hydrogen by: (a) a catalytic exchange reaction such as HTO+$H_2$→$H_2O$+HT; (b) direct electrolysis of water, i.e., HTO→HT+½$O_2$; or (c) water decomposition by a suitable reaction such as the water gas shift reaction: HTO+CO→HT+$CO_2$. (See Kalyanam and Sood "Fusion Technology" 1988, pp 525-528; A. Busigin and P. Gierszewski, "Fusion Engineering and Design" 1998 pp 909-914; D. K. Murdoch et al, "Fusion Science and Technology" 2005, pp 3-10; K. L. Sessions, "Fusion Science and Technology" 2005, pp 91-96; J. Cristescu et al, "Fusion Science and Technology" 2005, pp 97-101; J. Cristescu et al, "Fusion Science and Technology" 2005, pp 343-348.)

The prior art large scale hydrogen isotope separation cryogenic distillation process has the following drawbacks:
1. Handling of liquid cryogens with associated hazards, such as high pressure potential upon warm-up and evaporation, thermal stresses due to very low temperature process conditions and the requirement for a vacuum insulated coldbox vessel to contain the cryogenic equipment;
2. The potential for blockage of process lines due to freezing of impurities;
3. Complex and costly process plant;
4. Complex operation and maintenance;
5. Non-modular process, making it difficult to upgrade and to keep equipment spares;
6. Requires batch operated dryers and a liquid nitrogen adsorber to purify feed to the cryogenic distillation cascade.

Water distillation has been used in the past primarily for heavy water production and upgrading, and not specifically for tritium recovery. Tritium is easier to separate than deuterium from light water by water distillation. The elementary separation factors in distillation arise from differences in vapor pressures of the isotopic water species. For example, at a temperature of 51° C., the elementary separation factor for HDO/$H_2O$ is 1.052, whereas for HTO/$H_2O$ it is 1.064. The separation factor for DTO/$D_2O$ is much smaller at 1.012, making tritium recovery from heavy water by water distillation difficult. (W. Alexander Van Hook, Journal of Physical Chemistry, Vol. 72, No. 4, pp 1234-1244, 1968.)

Due to presence of natural deuterium at approximately 150 ppm, water distillation enrichment of tritium in light water is easy only when the deuterium concentration is small, which corresponds to a maximum practical enrichment in light water of about 1000 times. This degree of tritium enrichment is sufficient in many practical applications to reduce the tritium enriched product flow to a magnitude compatible with one or more downstream thermal diffusion columns, after conversion of water to an elemental hydrogen stream.

Thermal diffusion has been used successfully for small scale tritium separation, even up to ≧99% tritium, but cannot be easily scaled for large throughput. This is because thermal diffusion columns must operate in the laminar flow regime, and scale-up would push column operation into the turbulent flow regime (R. Clark Jones and W. H. Furry, "Reviews of Modern Physics", 1946, pp 151-224). The alternative of constructing many small thermal diffusion columns in parallel is unattractive when the throughput requirement is large. Thermal diffusion columns also have low thermodynamic efficiency, which while unimportant at small scale becomes problematic at large scale.

SUMMARY OF THE INVENTION

In a first aspect of the invention, there is provided a process for recovery of tritium from a mixture containing heavy and light hydrogen isotopes in a water feed material, which process comprises:
i) distilling a sample of water containing said mixture of hydrogen isotopes under conditions to separate water containing lighter hydrogen from water containing heavier hydrogen from said mixture;
ii) converting water enriched in heavy hydrogen from step i) under catalytic conditions and in the presence of carbon monoxide into a mixture of hydrogen isotopes and oxides of carbon; and
iii) separating hydrogen isotopes from step ii) by thermal diffusion.

According to a preferred embodiment of the invention, there is provided a process for tritium removal from a mixture containing heavy and light water by water distillation tritium stripping and enrichment, followed by conversion of tritiated water to an elemental hydrogen stream, followed by final tritium enrichment by thermal diffusion. When combined with a suitable oxidation process, the method therefore provides a multi-stage procedure for converting complex tritium-labelled organic and/or inorganic waste products, which may arise from laboratory and other industrial processes, into a simple elemental form of tritium. In the context of the present invention, the term "heavy" isotopes in a water feed material is intended to mean water containing the tritium isotope of hydrogen. Correspondingly, the term "light" isotopes in a water feed material is intended to mean water containing protium (and small amounts of deuterium) isotope of hydrogen. Suitably, the process is capable of de-tritiating water containing parts per million of tritium and generating tritium at at least 90% isotopic abundance, and preferably at least 99% isotopic abundance. This process benefits from the effectiveness of tritium stripping and enrichment by water distillation of light water at large throughputs and low tritium concentrations with the simplicity of thermal diffusion for the small throughput required for final enrichment. Furthermore, the process may be adjusted to provide a large-scale non-cryogenic process for de-tritiation of light water that is simpler and more economical than a conventional cryogenic distillation process. Such a process is simpler to start-up, shutdown, operate and provides a process having reduced hazards through elimination of liquid cryogens, by comparison with a conventional cryogenic distillation process. Furthermore, the process requires a significantly smaller elemental hydrogen isotope inventory than a conventional cryogenic distillation process.

Suitably, the process may be operated batchwise, or alternatively in a continuous process. Preferably, the process is a continuous process. Thus, the process is compatible with any intermediate conversion process to convert tritiated water to elemental hydrogen including electrolysis, water decomposition by water gas shift reactor (i.e. palladium membrane reactor) or a hot metal bed reactor.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment of the present invention are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
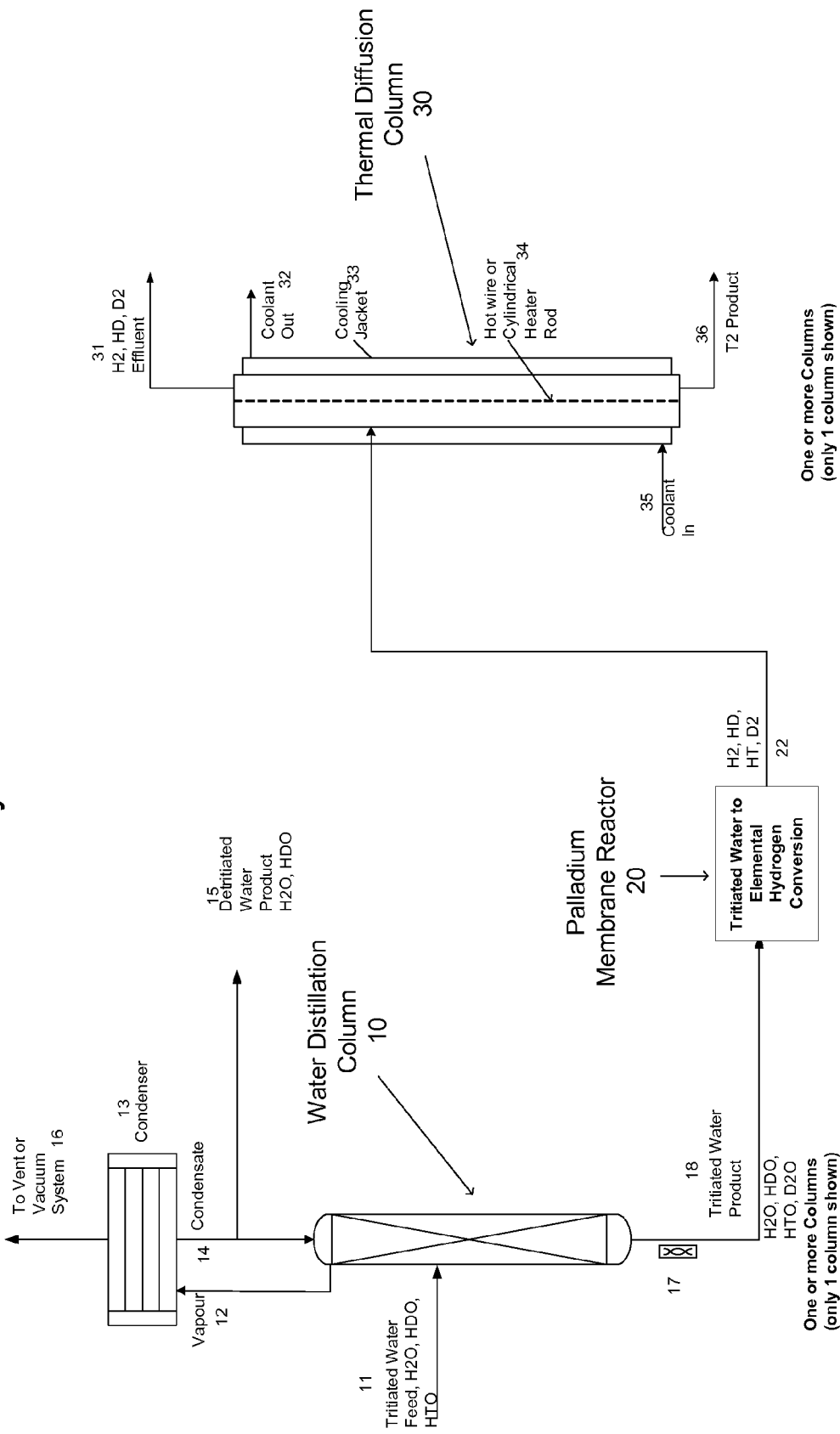
FIG. 1 is a process flow diagram illustrating the combined processes in one embodiment of the invention.

In accordance with one embodiment of the present invention, FIG. 1 shows a conceptual process flow diagram for a water detritiation system according to one embodiment of the present invention. In a first stage of the process, a tritiated water feed (11) is fed into a water distillation column (10) at a point where the concentration in the column is approximately the same as the feed concentration. The function of the water distillation system is to concentrate tritiated water produced from upstream processes, so as to minimize the size of downstream operations. Suitably, the water feed may be derived from any organic and/or inorganic mixture of compounds labeled with tritium, suitably organic, carbon-containing waste products. The waste is heated and combined with oxygen, thereby converting larger complex organic molecules into water for feeding into the present process, and carbon dioxide. A suitable apparatus for oxidizing organic waste is disclosed in patent application number GB 0516879.4 (Amersham Biosciences UK Limited) later filed as PCT/GB2006/003090 and published as WO 2007/020454 (GE Healthcare UK Limited). When the products of the reaction are cooled to room temperature, the carbon dioxide and any excess oxygen may be monitored and released, or captured.

While FIG. 1 shows only one distillation column (10) employed in the method, in practice more than one column (10A; 10B; etc) may be employed in series, suitably from one to five, preferably two columns. In the first column, tritiated water is stripped from excess protium and deuterium water before releasing the tritiated water to drain. In the preferred embodiment, two water distillation columns are employed in series, in which a second column enriches the tritiated water produced in the first column. By employing two such distillation columns in the process, tritiated water may be enriched by between two and three orders of magnitude, preferably three orders of magnitude. Each separate column may be of the same or different dimensions from other distillation columns employed in the series. Each column may have a circular cross-section and is suitably between about 5 meters and about 100 meters in length (height) and between about 0.02 meters and about 2.5 meters in diameter. To facilitate access to the column, preferably each column is fitted with removable end walls which carry inlet and outlet tubes. Typically, a first column may have dimensions of preferably between 0.2 meters and 0.3 meters in diameter and between 10 and 15 meters in height. More preferably the first column has dimensions of 0.2-0.25 meters (diameter) and 12 meters (height). The second column may have smaller dimensions, typically 0.05 meters×7.8 meters. Suitably, column (10) is of tubular construction and may be formed from a rigid material which is resistant to aqueous-based fluids and elevated temperatures. Preferably the columns are constructed from stainless steel. Alternatively, glass construction may be used. Each water distillation column used in the process operates with a pressure gradient between each end of the column. Suitably, each water distillation column may be operated at a pressure of between 0.05 bar and 1.2 bar, preferably between about 0.1 bar and 0.4 bar (absolute pressure).

In one embodiment, each column is filled with a packing material employed to improve interfacial liquid to vapor contact and therefore to increase separation efficiency of the tritium/hydrogen containing water mixture. In principle, any suitable packing material may be used, providing that such material is inert under the distillation conditions employed. Examples include glass beads, phosphor bronze metal beads, perforated metal strips and the like. Alternatively, a structured packing such as Sulzer BX or CY. For optimum separation, preferably each column is packed with mesh rings each formed into a cylindrical shape and being fabricated from stainless steel (Dixon rings). Dixon rings vary from 1.5 mm to 6.0 mm in diameter, and can provide a large surface area in a small volume, thereby enabling efficient separation.

In one embodiment, each of the water distillation columns may be fitted with one or more, preferably up to six liquid distributors at intervals inside the column. Fitting of such liquid distributors enables a randomly packed column to overcome the tendency of liquid in such columns to migrate towards the walls of the column which may reduce contact between liquid and vapor, and as a consequence may reduce column efficiency. There are many known designs of liquid distributor, see for example "Liquid Distribution for Optimum Packing Performance", D Perry, D E Nutter and A Hale, Chem.Eng.Progress, (1990) p 30-35. Known liquid distributors do not function efficiently at low flow rates. A preferred liquid distributor is one which operates efficiently at low water flow rates and is shown in FIG. 3.

Figure 3:
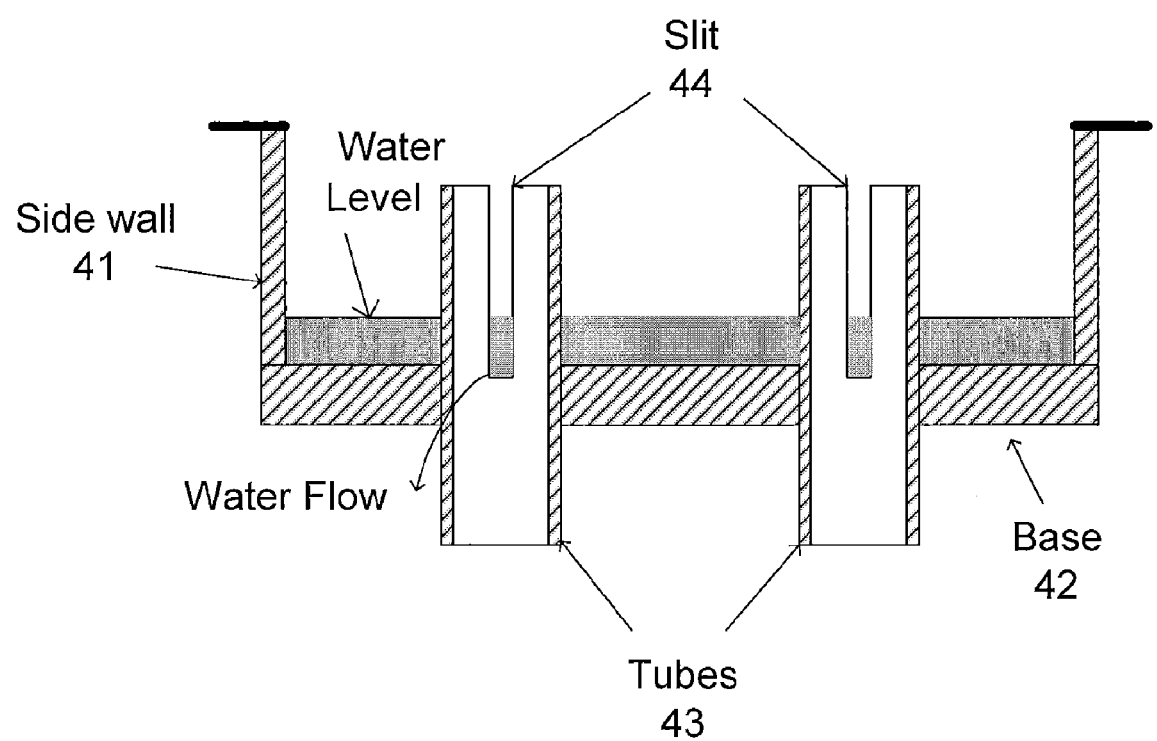
FIG. 3 is a schematic diagram illustrating the features of a liquid distributor plate.

Referring to FIG. 3, a liquid distributor plate (40) is shown schematically having an open top, a side wall (41) and a base (42). The distributor (40) is sized to fit inside the distillation column. The base (42) is therefore preferably of circular dimensions. The base plate of the liquid distributor is fitted with an array of tubes (43) disposed substantially vertically and passing through the base of the distributor plate. Each tube is open at both ends such that liquid can pass from one side of the base to the other. The tubes are suitably between about 4 and 8 mm in diameter, preferably about 6 mm in diameter. The height of each tube above the base of the distributor plate should not extend above the side wall of the distributor and is preferably lower than the height of the side wall of the liquid distributor plate. One or more slits (44), preferably one slit, are formed in each tube, each said slit extending from the upper surface of the base plate and extending to the open upper end of the tube. Suitably, each slit has a width of between about 0.5 and 1.0 mm. In operation, liquid flowing onto the distributor plate spreads across the plate until the depth of the liquid is sufficient to overcome the surface tension at the slit. At this point liquid flows through a tube and into the distillation column below the liquid distributor. Suitably, the liquid distributor plate is fabricated from a rigid material that is resistant to aqueous based fluids and elevated temperatures, typically stainless steel or phosphor bronze. Preferably, the liquid distributor is fabricated from stainless steel. Each liquid distributor may be fixed by suitable well known fixing means inside the distillation column.

Referring again to FIG. 1, the vapor (12) at the top of the column is condensed in condenser (13), and condensate (14) from condenser (13) is returned by gravity as reflux to the top of the column, with a fraction (15) taken as detritiated water product. Non-condensable gases (16) are removed to vent or a vacuum system. Normally, water distillation columns operate under vacuum to take advantage of improved separation at lower boiling temperature. A re-boiler (17) at the bottom of the water distillation column boils up liquid and sends vapor back up the column. A small tritium enriched water stream (18) is withdrawn at the bottom of the water distillation column and sent to a conversion process (20) to reduce the water stream to an elemental hydrogen stream (22).

Figures 2, 2A, 2B:
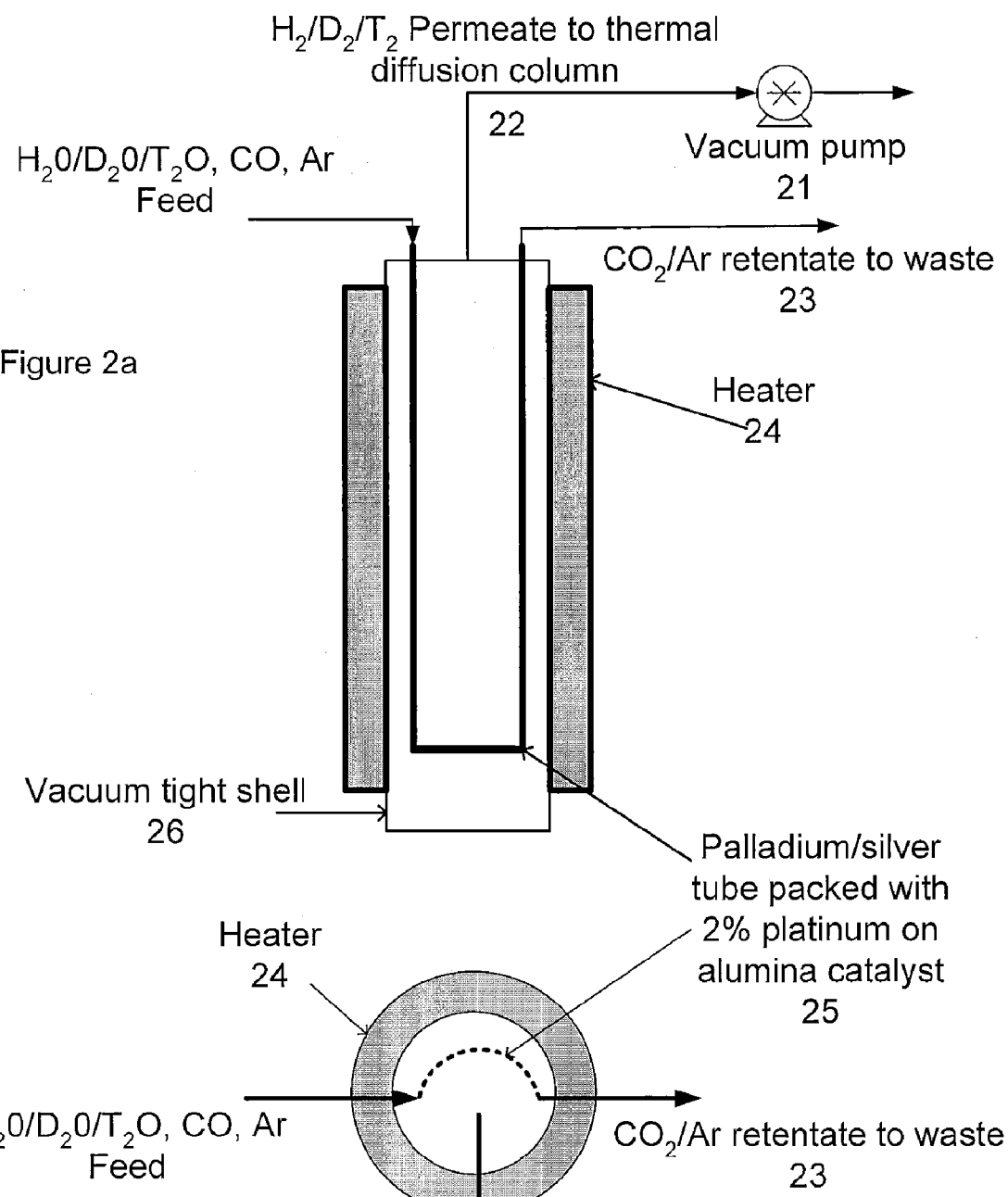
FIG. 2 is a schematic diagram showing the palladium membrane reactor according to an embodiment of the invention.

In a second conversion stage of the process, water enriched in heavier hydrogen from step i) is converted into a mixture of hydrogen isotopes. The conversion process may suitably be performed by an electrolysis cell, a water-gas shift reactor or other conversion process. A suitable process for the recovery of hydrogen and hydrogen isotopes from water is described in U.S. Pat. No. 6,165,438 (Willms et al.). Feed material from step i) of the process is mixed with carbon monoxide (in the presence of carrier Argon gas) and converted under catalytic conditions into a mixture of hydrogen isotopes and oxides of carbon. The inlet gas mixture is caused to flow over a heated catalyst which promotes the following reaction: $H_2O + CO \rightarrow H_2 + CO_2$ (Water-gas shift reaction). The preferred palladium membrane reactor design is shown schematically (FIG. 2a) and in plan (FIG. 2b) and consists of a hydrogen gas permeable tube made from palladium/silver (Pd/Ag) alloy 925, fashioned into a "U"-shape and having the dimensions: total length 120 cm and 1.2 cm outside diameter, with a wall thickness of 345 microns. Other tube lengths are suitable, and may preferably be between about 0.6 m and about 200 m in overall length and between about 0.3 cm and 2.5 cm in diameter. The 120 cm tube is housed within a vacuum-tight shell approximately 0.6 meters long by 15 cm diameter and made of stainless steel (26). The ends of the shell are closed with vacuum tight flanges onto one of which the membrane tube is mounted and connected to the process tubing. An additional connection to the flange is connected to a vacuum pump (21) which allows the shell to be maintained at a high vacuum (21). The shell is heated externally by an appropriate heater (24). The Pd/Ag tube contains a catalyst, suitably 2% platinum on alumina, as pellets of diameter 0.125 cm. Alternative catalysts may be selected from nickel/alumina, ruthenium/alumina, palladium/alumina and iron/alumina.

In operation, reactants consisting of a mixture of tritiated water (from the distillation process of step i), carbon monoxide and argon are fed into the conversion apparatus and passed through the heated palladium membrane tube, thereby promoting the water-gas shift reaction. The reactor temperature is suitably between about 450° C. and about 550° C. In a preferred embodiment, the reactor temperature is held at 475° C.

During the time that the reaction takes place in the presence of the heated catalyst, hydrogen and tritium are extracted through the palladium/silver membrane by pumping annular space within the vacuum tight shell (26) to high vacuum. The permeate, thus enriched in hydrogen and tritium, is then passed to the final stage (step iii)) of the process. The mixture of gases which do not pass through the palladium/silver (termed the retentate (23) and consisting of a mixture of carbon dioxide and argon) is monitored and may be discharged to waste.

In step iii) of the process, the elemental hydrogen stream (22) is fed to the thermal diffusion column (30) for final enrichment of tritium. The thermal diffusion column is shown in FIG. 1, and is comprised of a hot-wire or cylindrical heating rod (34) located concentrically inside a tube surrounded by a cooling jacket (33). Tritium product (36) is withdrawn from the bottom of the column (30), and tritium depleted gas (31) is rejected as effluent from the top of the column. Suitably, the coolant liquid may be water which is passed through the apparatus at a temperature of between about 5° C. and 60° C. Alternative coolants may be used, for example liquid nitrogen. The coolant inlet (35) is suitably located at the bottom of the thermal diffusion column, and the coolant outlet (32) is suitably at the top of the column. The separation performance of a thermal diffusion column improves as the ratio of elevated temperatures to ambient or below ambient temperatures is increased. In one embodiment, one thermal diffusion column (30) is shown in FIG. 3. In another embodiment, more that one column may be employed either connected in parallel or in series, depending on the application.

By combining the scalability of the water distillation column (10) with one or more small throughput thermal diffusion columns (30), the overall process makes optimal use of water distillation and thermal diffusion. Either process option on its own is either unattractive or impractical. Furthermore, the combined water distillation and thermal diffusion system is much simpler to operate than a conventional cryogenic distillation cascade. There are no complex startup, operation, or shutdown sequences. The process may be employed in continuous mode with no necessity for batch operations.

The present invention also provides a combined water distillation and thermal diffusion process for converting tritiated water to elemental hydrogen and tritium. This process comprises: (i) distilling a sample of water containing a mixture of hydrogen isotopes under conditions to separate water containing lighter hydrogen from water containing heavier hydrogen from the mixture; (ii) converting tritiated water to elemental hydrogen by a process selected from electrolysis and water gas shift reactor; and (iii) separating hydrogen isotopes from step (ii) by thermal diffusion.

The present invention also provides a system for converting tritiated water containing a mixture of hydrogen isotopes into elemental hydrogen and tritium, the system comprising: a) distillation means for distilling a sample of water containing said mixture of hydrogen isotopes; b) conversion means for converting water enriched in heavy hydrogen under catalytic conditions and in the presence of carbon monoxide into a mixture of hydrogen isotopes and oxides of carbon; and c) separation means for separating hydrogen isotopes.

While aspects of the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A process for recovering tritium from a mixture containing heavy and light hydrogen isotopes in a water feed material, which process comprises:
   i) distilling a sample of water containing said mixture of hydrogen isotopes under conditions to separate water containing lighter hydrogen from water containing heavier hydrogen from said mixture;
   ii) converting water enriched in heavier hydrogen from step i) under catalytic conditions and in the presence of carbon monoxide into a mixture of hydrogen isotopes and oxides of carbon; and
   iii) separating hydrogen isotopes from step ii) by thermal diffusion.

2. The process of claim 1, wherein said process is a continuous process.

3. The process of claim 1, wherein said distillation step i) comprises:
   a) distilling said sample of water by means of a first distillation column such that tritiated water is stripped substantially free from said mixture containing heavy and light hydrogen isotopes in said water feed material; and
   b) distilling said tritiated water from step a) by means of a second distillation column such that said tritiated water is enriched.

4. The process of claim 3, wherein said enrichment step b) provides between about a 100-fold and a 1000-fold enrichment of tritiated water.

5. The process of claim 3, wherein said first and second distillation columns are packed with a packing material employed to improve interfacial liquid vapor contact.

6. The process of claim 5, wherein said packing material is selected from the group consisting of glass beads, phosphor bronze metal beads, perforated metal strips and stainless steel mesh.

7. The process of claim 5, wherein said packing material comprises Dixon rings.

8. The process of claim 3, wherein said first and second distillation columns are fitted with one or more liquid distributors.

9. The process of claim 8, wherein said first and second distillation columns are fitted with 1-6 liquid distributors.

10. A combined water distillation and thermal diffusion process for converting tritiated water to elemental hydrogen and tritium, comprising:
    i) distilling a sample of water containing a mixture of hydrogen isotopes under conditions to separate water containing lighter hydrogen from water containing heavier hydrogen from said mixture;
    ii) converting tritiated water to elemental hydrogen and tritium by a process selected from the group consisting of electrolysis and water gas shift reactor; and iii) separating elemental hydrogen and tritium from step ii) by thermal diffusion.

11. A system for converting tritiated water containing a mixture of hydrogen isotopes into elemental hydrogen and tritium, comprising:
    a) a water distillation column for distilling a sample of water containing said mixture of hydrogen isotopes;
    b) a conversion apparatus for converting water enriched in heavy hydrogen under catalytic conditions and in the presence of carbon monoxide into a mixture of hydrogen isotopes and oxides of carbon; and
    c) a thermal diffusion column for separating hydrogen isotopes.

* * * * *